United States Patent
Park et al.

(10) Patent No.: US 8,982,722 B1
(45) Date of Patent: Mar. 17, 2015

(54) DETERMINING WIRELESS COMMUNICATION GAIN

(71) Applicant: Sprint Spectrum LP, Overland Park, KS (US)

(72) Inventors: Sungki Park, Ashburn, VA (US); Saied Kazeminejad, Ashburn, VA (US); Brent Scott, Drexel, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 147 days.

(21) Appl. No.: 13/688,196

(22) Filed: Nov. 28, 2012

(51) Int. Cl.
  *H04W 72/08* (2009.01)
(52) U.S. Cl.
  CPC ............ *H04W 72/08* (2013.01); *H04W 72/085* (2013.01)
  USPC .......................................... 370/252; 370/329
(58) Field of Classification Search
  USPC .................................................. 370/252, 329
  See application file for complete search history.

(56) References Cited

U.S. PATENT DOCUMENTS

| | | | |
|---|---|---|---|
| 2010/0195614 A1 | 8/2010 | Nimbalker et al. | |
| 2012/0287881 A1* | 11/2012 | Arnott et al. | 370/329 |
| 2013/0115985 A1* | 5/2013 | Davydov et al. | 455/501 |
| 2013/0148624 A1* | 6/2013 | Gil et al. | 370/329 |
| 2013/0230019 A1* | 9/2013 | Manssour et al. | 370/330 |
| 2013/0294398 A1* | 11/2013 | Tujkovic et al. | 370/330 |
| 2013/0322241 A1* | 12/2013 | Fantaye et al. | 370/232 |

OTHER PUBLICATIONS

ZTE, "Discussion on TBS scaling factor for additional TDD special subframe configurations", May 21, 2012, 3GPP TSG RAN WG1 Meeting #69, R1-122116, pp. 1-6.*

Ericsson, "Clarification of TBS determination for PDSCH scheduled by EPDCCH", Nov. 21, 2012, 3GPP TSG-RAN WG1 #71, R1-124900, pp. 1-2.*

* cited by examiner

*Primary Examiner* — Paul H Masur

(57) ABSTRACT

Combinations of a number of physical resource blocks and modulation and coding schemes which meet a data rate threshold are selected. For each combination of the number of physical resource blocks and modulation and coding schemes, a signal gain is calculated. The combination of the number of physical resource blocks and modulation and coding schemes corresponding to the largest signal gain is selected, and information is transmitted from an access node to a wireless device over a communication link using the selected combination of the number of physical resource blocks and modulation and coding schemes.

13 Claims, 5 Drawing Sheets

| $I_{TBS}$ | 1 | 2 | 3 | 4 | 5 | 6 | 7 | 8 | 9 | 10 |
|---|---|---|---|---|---|---|---|---|---|---|
| | | | | | $N_{PRB}$ | | | | | |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 476 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2356 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |

FIG. 2

DETERMINING WIRELESS COMMUNICATION GAIN

TECHNICAL BACKGROUND

Wireless communication systems permit wireless devices to communicate with communication networks to obtain a variety of services, including interconnect communication, short message service, packet data communications and dispatch communications. The performance level of communication links in a wired or wireless communication network is based in part on the link capacity of communication links. Greater link capacity correlates with, for example, higher data throughput, which allows a communication network to provide greater guaranteed quality of service to a receiving device. A wireless communication link is typically subject to a link budget, which accounts for all gains and losses from a transmitter as well as for the attenuation of the transmitted signal from various losses.

Overview

In an embodiment, combinations are selected of a number of physical resource blocks (PRBs) and modulation and coding schemes (MCSs) which meet a data rate threshold. For each combination of the number of PRBs and MCSs, a signal gain is calculated. The combination of the number of PRBs and MCS corresponding to the largest signal gain is selected, and information is transmitted between an access node and a wireless device over a communication link using the selected combination of the number of PRBs and MCS.

BRIEF DESCRIPTION OF THE DRAWINGS

FIG. 2 illustrates an exemplary transport block size table.

DETAILED DESCRIPTION

Figure 1:
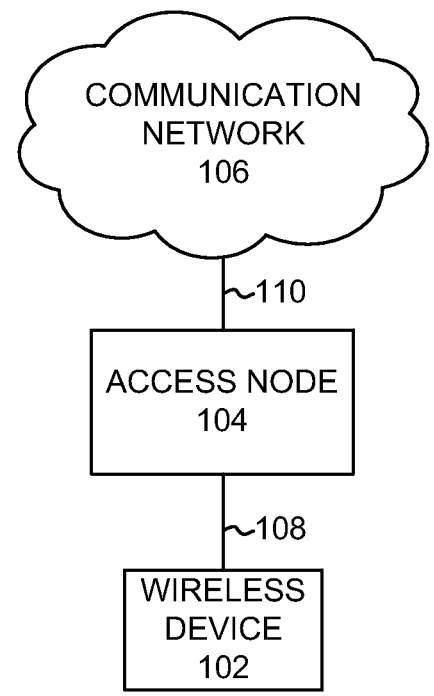
FIG. 1 illustrates an exemplary communication system for determining a wireless communication gain.

FIG. 1 illustrates an exemplary communication system 100 comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 through communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 through communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

FIG. 2 illustrates an exemplary transport block size table, comprising transport block sizes according to a transport block size index ($I_{TBS}$) and a number of physical resource blocks ($N_{PRB}$). In order to achieve a certain level of throughput over communication link 108 between access node 104 and wireless device 102, a transport block size can be determined. In the Media Access Control (MAC) layer, information to be transmitted over a wireless communication link can be organized into transport blocks. A transport block size can be determined based on a number of physical resource blocks (PRBs) and a Modulation and Coding Scheme (MCS) assigned to communications with a wireless device. For example, for an allocation of 1 PRB, and a transport block size index of 14, the resultant transport block size is 256. The transport block sizes indicate a number of bits which can be transmitted during a subframe or a transmission time interval (TTI). In embodiments, the timing of a subframe or TTI other time interval can be determined based on a particular radio access technology. Transport block size per unit time can therefore be correlated with data throughput. The transport block sizes illustrated in FIG. 2 are merely illustrative and are not intended as limiting to the values illustrated therein.

A wireless communication link is typically subject to a link budget, which accounts for all gains and losses from a transmitter (such as an access node, or a wireless device) as well as for the attenuation of the transmitted signal from various losses. If an estimated received power of a communication link is sufficiently large, the communication link will be useful for sending data. A signal gain can be increased within a link budget to increase signal reception at a receiver.

In an embodiment, combinations of a number of physical resource blocks (PRBs) and modulation and coding schemes (MCSs) which meet a data rate threshold are selected. For each combination of the number of PRBs and MCSs, a signal gain is calculated. The combination of the number of PRBs and MCS corresponding to the largest signal gain is selected, and information is transmitted from access node 104 to wireless device 102 over communication link 108 using the selected combination of the number of PRBs and MCS.

Figure 3:
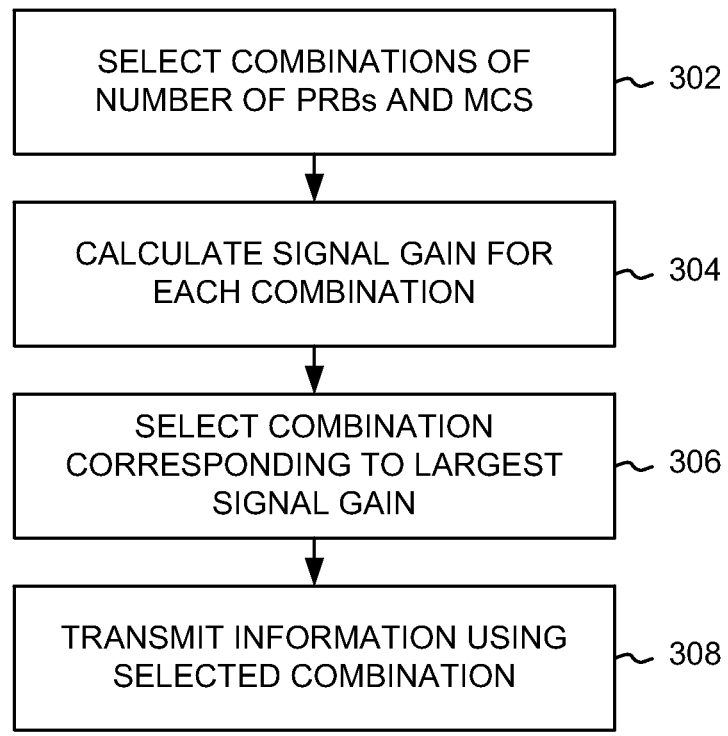
FIG. 3 illustrates an exemplary method of determining a wireless communication gain.

FIG. 3 illustrates an exemplary method of determining a wireless communication gain. In operation 302, combinations of a number of physical resource blocks (PRBs) and modulation and coding schemes (MCSs) which meet a data rate threshold are selected. For example, referring to FIG. 2, when a desired transport block size is 256, combinations of a number of PRBs ($N_{PRB}$) and an MCS ($I_{TBS}$) can be selected including ($N_{PRB}$=1; $I_{TBS}$–14), ($N_{PRB}$=2; $I_{TBS}$–8), ($N_{PRB}$=3; $I_{TBS}$–6), ($N_{PRB}$=4; $I_{TBS}$–4), ($N_{PRB}$=5; $I_{TBS}$–3), ($N_{PRB}$=6; $I_{TBS}$–2), ($N_{PRB}$=8; $I_{TBS}$=1), and ($N_{PRB}$=10; $I_{TBS}$=0). Other combinations can be selected based on a desired transport block size.

Returning to FIG. 3, in operation 304, a signal gain is calculated for each combination of the number of PRBs and MCS. For example, a signal gain for a combination can be determined as a function of a number of PRBs, a radiated power per resource block, and an MCS. A required level of signal-to-noise ratio can also be considered to determine a signal gain for a combination. In an embodiment, signal gain can be defined as a function of power per PRB and noise density, for example, SignalGain=f($P_{PRB}$,$N_D$), where $P_{PRB}$ is power per PRB and $N_D$ is noise density. An example of f($P_{PRB}$,$N_D$) can be $$\frac{1}{P_{PRB} \cdot N_D},$$

which expresses a trade-off of power per PRB and noise density for the signal gain. In an embodiment, to meet a given throughput target, the power per PRB can be decreased in order to increase the signal gain. However, noise density may increase as power per PRB is decreased, as more PRBs must be allocated to achieve the throughput target. In an embodiment, the signal gain also can be a traditional system gain in link budget.

In operation 306, the combination of the number of PRBs and MCS is selected which corresponds to the largest signal gain from among the calculated signal gains. For example, with reference to FIG. 2, of the combinations of a number of PRBs (indicated by $N_{PRB}$) and an MCS (indicated by $I_{TBS}$) corresponding with a transport block size of 256, the combination ($N_{PRB}$=5; $I_{TBS}$=3) may correspond with the largest signal gain as compared to the other combinations. The combination ($N_{PRB}$=5; $I_{TBS}$=3) can be selected, and using the selected combination of the number of PRBs and MCS information can be transmitted over a communication link, such as communication link 108 (operation 308).

Figure 4:
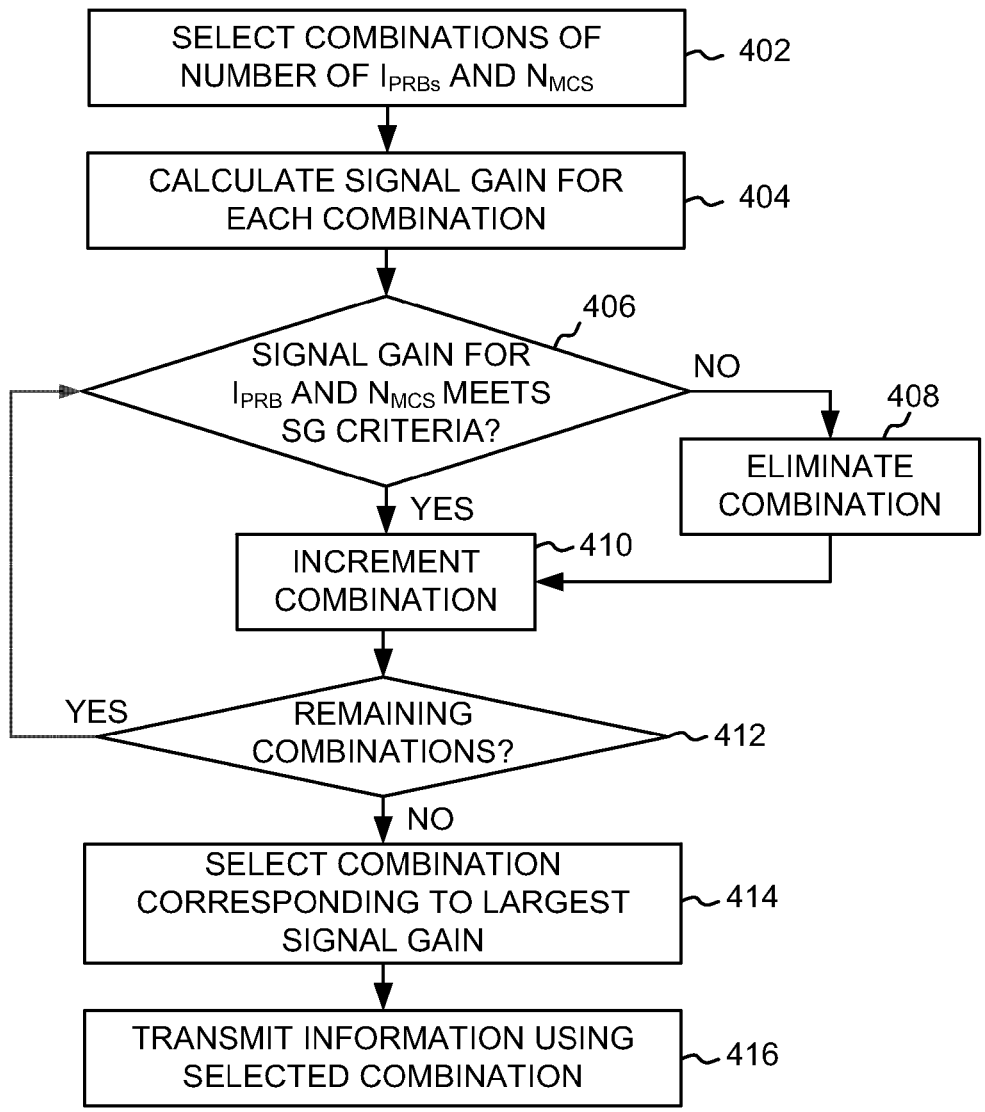
FIG. 4 illustrates another exemplary method of determining a wireless communication gain.

FIG. 4 illustrates another exemplary method of determining a wireless communication gain. In operation 402, combinations of a number of physical resource blocks (PRBs) and modulation and coding schemes (MCSs) which meet a data rate threshold are selected. For each combination of the number of PRBs and MCS, a signal gain is calculated (operation 404).

In operation 406, it is determined whether the calculated signal gain for each combination meets a signal gain criteria.

In an embodiment, the signal gain criteria can be a link budget for a wireless communication link, and it can be determined whether the calculated signal gain for each combination is less than, equal to, or greater than the link budget for the wireless communication link.

When the signal gain of a combination does not meet the signal gain criteria (operation 406—NO), the combination is eliminated from further consideration (operation 408). For example, when a signal gain of a combination exceeds a link budget for the wireless communication link, the combination can be eliminated from consideration. When the signal gain of a combination meets the signal gain criteria (operation 406—YES), the combination is selected, and the next combination is considered (operation 410). Selected combinations are considered until no further combinations remain (operation 412). Thus, a first subset of the selected combinations of number of PRBs and MCSs can be selected for which the calculated signal gain meets a signal gain criteria.

In an embodiment, the signal gain can be calculated based on a signal power per PRB. In an embodiment, the signal power can be an effective radiated power per PRB, such as an effective isotropically radiated power per PRB. As another example, the signal gain can also be calculated based on the combination of a number of PRBs and an MCS and a signal power per PRB. In an embodiment, a signal-to-noise ratio of the communication link can also be considered, such that the signal gain can be calculated based on the combination of number of PRBs and MCS, a signal power per PRB, and a signal-to-noise ratio. In addition, the signal-to-noise ratio can be compared to a signal-to-noise ratio criteria. Examples of a signal-to-noise ratio criteria include a required signal-to-noise ratio, and a minimum signal-to-noise ratio, for example, to support a desired, minimum, or required data rate over a wireless communication link.

In operation 414, the combination corresponding to the largest signal gain is selected, and information is transmitted using the selected combination (operation 416). For example, when the combination corresponding to the largest signal gain is selected, information can be transmitted from access node 104 to wireless device 102 over communication link 108. The information can thus be transmitted using the combination of the number of PRBs and MCS corresponding with the largest signal gain for a given transport blocks size, and by extension, for a given data rate or throughput from the access node to the wireless device. In an embodiment, the combination of number of PRBs and MCS corresponding to the largest signal gain is selected from the first subset of the combinations.

Figure 5:
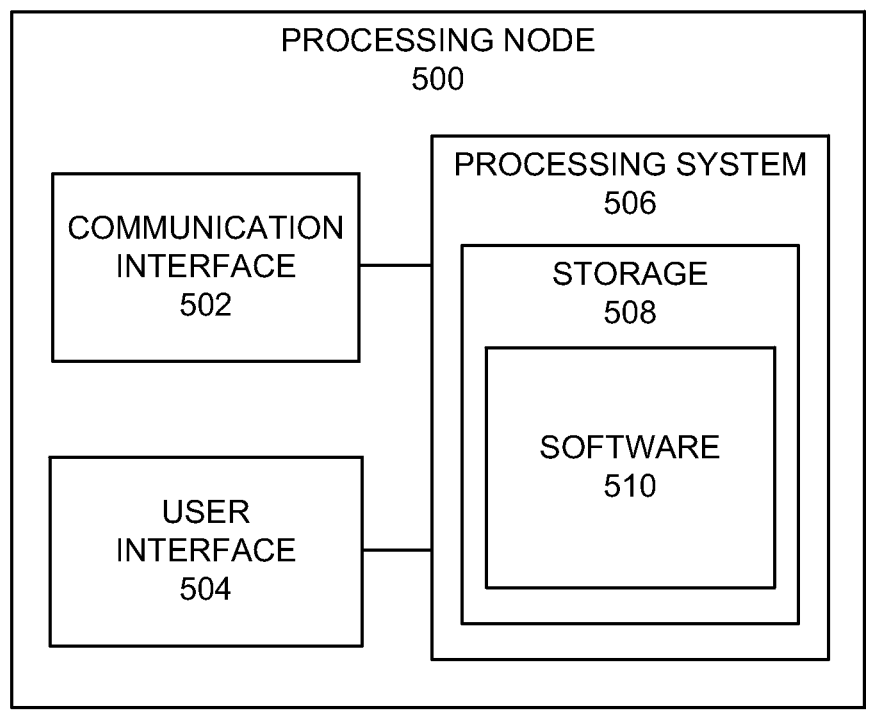
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of detecting unauthorized tethering by a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104. Processing node can also be an adjunct or component of a network element, such as an element of access node 104. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining a wireless communication gain, comprising:
    selecting combinations of a number of physical resource blocks (PRBs) and modulation and coding schemes (MCSs) which meet a data rate threshold;
    calculating a signal gain for each combination of the number of PRBs and MCS, wherein calculating a signal gain is based on the combination of number of PRBs and MCS and a signal power per PRB;
    selecting the combination of the number of PRBs and MCS corresponding to the largest signal gain from among the calculated signal gains; and
    transmitting information over a communication link using the selected combination of the number of PRBs and MCS.

2. The method of claim 1, wherein the data rate threshold is based on a correlation of a transport block size and a data rate.

3. The method of claim 1, wherein the signal gain is less than or equal to a link budget of a communication link.

4. The method of claim 1, wherein calculating a signal gain is based on an effective radiated power per PRB.

5. The method of claim 4, wherein the effective radiated power is an effective isotropically radiated power.

6. The method of claim 1, wherein calculating a signal gain is based on the combination of number of PRBs and MCS, a signal power per PRB, and a signal-to-noise ratio criteria.

7. The method of claim 1, further comprising:
    calculating a signal gain for each combination of the number of PRB and MCS;
    selecting a first subset of the selected combinations of number of PRBs and MCSs for which the calculated signal gain meets a signal gain criteria; and
    selecting from the first subset a combination of number of PRBs and MCS corresponding to the largest signal gain from among the calculated signal gains of combinations in the first subset.

8. A system for determining a wireless communication gain, comprising:
    an access node comprising a processor and memory, wherein the access node is configured to:
    select combinations of a number of physical resource blocks (PRBs) and modulation and coding schemes (MCSs) which meet a data rate threshold;
    calculate a signal gain for each combination of the number of PRBs and MCS, wherein calculating a signal gain is based on the combination of number of PRBs and MCS and a signal power per PRB;
    select the combination of the number of PRBs and MCS corresponding to the largest signal gain from among the calculated signal gains; and
    transmit information over a communication link using the selected combination of the number of PRBs and MCS.

9. The system of claim 8, wherein the data rate threshold is based on a correlation of a transport block size and a data rate.

10. The system of claim 8, wherein the signal gain is less than or equal to a link budget of a communication link.

11. The system of claim 8, wherein calculating a signal gain is based on an effective radiated power per PRB, and the effective radiated power is an effective isotropically radiated power.

12. The system of claim 8, wherein the access node is further configured to calculate a signal gain based on the combination of number of PRBs and MCS, a signal power per PRB, and a signal-to-noise ratio criteria.

13. The system of claim 8, wherein the access node is further configured to:
    calculate a signal gain for each combination of the number of PRB and MCS;
    select a first subset of the selected combinations of number of PRBs and MCSs for which the calculated signal gain meets a signal gain criteria; and
    select from the first subset a combination of number of PRBs and MCS corresponding to the largest signal gain from among the calculated signal gains of combinations in the first subset.

* * * * *